(12) United States Patent
Conwell

(10) Patent No.: US 7,381,961 B2
(45) Date of Patent: Jun. 3, 2008

(54) MULTI-SMALL FIELD-OF-VIEW DETECTOR HEAD SPECT SYSTEM THAT SCANS OVER 360Å

(75) Inventor: Richard L. Conwell, Del Mar, CA (US)

(73) Assignee: Digirad Corporation, Poway, CA (US)

( * ) Notice: Subject to any disclaimer, the term of this patent is extended or adjusted under 35 U.S.C. 154(b) by 182 days.

(21) Appl. No.: 11/235,662

(22) Filed: Sep. 26, 2005

(65) Prior Publication Data

US 2006/0157653 A1 Jul. 20, 2006

Related U.S. Application Data

(60) Provisional application No. 60/612,744, filed on Sep. 24, 2004.

(51) Int. Cl.
*G01T 1/166* (2006.01)
(52) U.S. Cl. .............. 250/363.05; 250/363.02; 250/363.03; 250/363.04
(58) Field of Classification Search ........... 250/363.05, 250/363.02, 363.03, 363.04
See application file for complete search history.

(56) References Cited

U.S. PATENT DOCUMENTS

| | | | | |
|---|---|---|---|---|
| 5,349,190 A | * | 9/1994 | Hines et al. ........... | 250/363.05 |
| 5,752,916 A | * | 5/1998 | Guerard et al. ............. | 600/407 |
| 6,150,662 A | * | 11/2000 | Hug et al. ............. | 250/363.05 |
| 6,171,243 B1 | * | 1/2001 | Gagnon et al. ............. | 600/431 |
| 6,225,631 B1 | * | 5/2001 | Mastrippolito et al. | 250/363.02 |
| 6,242,743 B1 | * | 6/2001 | DeVito et al. ......... | 250/363.05 |
| 6,455,856 B1 | * | 9/2002 | Gagnon ..................... | 250/366 |
| 6,583,420 B1 | * | 6/2003 | Nelson et al. ............. | 250/397 |
| 7,233,002 B2 | * | 6/2007 | Ohana et al. .......... | 250/363.04 |
| 2003/0071219 A1 | * | 4/2003 | Motomura et al. .... | 250/363.05 |
| 2004/0173750 A1 | | 9/2004 | Welsh et al. | |
| 2005/0189494 A1 | | 9/2005 | Conwell | |
| 2006/0173302 A1 | * | 8/2006 | Conwell ..................... | 600/436 |

* cited by examiner

*Primary Examiner*—Christine Sung
(74) *Attorney, Agent, or Firm*—Law Office of SC Harris

(57) ABSTRACT

A multiheaded camera which is formed with a number of heads on one support structure and a different support structure with other heads. At least one of the heads is movable, so that the patient can obtain ingress and egress to the area.

19 Claims, 1 Drawing Sheet

MULTI-SMALL FIELD-OF-VIEW DETECTOR HEAD SPECT SYSTEM THAT SCANS OVER 360Å

The present application claims priority to provisional application No. 60/612,744, filed Sep. 24, 2004, the contents of which are herewith incorporated by reference.

BACKGROUND

Medical imaging systems may use nuclear materials, called radiopharmaceuticals, for the imaging. One such imaging system is single photon emission computed tomography, abbreviated as SPECT. Other medical imaging techniques may include positron emission tomography ("PET") as well as magnetic resonance imaging.

SPECT imaging attempts to produce a three-dimensional reconstruction of the intensity of the three-dimensional distribution of a photon emitter within the body of the subject being imaged. Typically the emitted photons are gamma-rays from the radiopharmaceutical. SPECT operates by back projecting multiple projection images acquired at equal angular increments over at least 180° around the subject. One or more detector heads collect these projection images and produce a two-dimensional image of the emitted gamma rays.

Having multiple detector heads may increase the camera system's efficiency. This increased efficiency can either be used to improve image quality or to reduce the time of the procedure.

The physical size of imaging heads on current multi-head SPECT cameras has typically limited the camera to have four heads that are positioned over 360°. For a four-headed system, the heads have been typically spaced at 90° increments. One limiting factor is the size of the heads. The head size may constrain the minimum orbit radius, which is the distance from the center of rotation to the photon-sensitive face of the detector heads, for such systems to be approximately 25 cm.

In addition, large heads arrayed over 360° may reduce the ability for patient ingress and egress from the imaging system. The patient enters the imaging volume by being translated into the imaging volume along the axis-of-rotation of the heads.

SUMMARY

An embodiment allows a multi-head Single Photon Emission Computed Tomography (SPECT) camera system to be constructed, whereby four or more of the detector heads are positioned within 360°. The present system allows a multi-head medical camera, e.g. a Single Photon Emission Computed Tomography (SPECT) camera system, or a positron emission tomography (PET) to be constructed whereby four, or more than four of the detector heads, are positioned within 360°. For example, this system may use 4, 5 or 6 heads.

DETAILED DESCRIPTION

Figure 1:
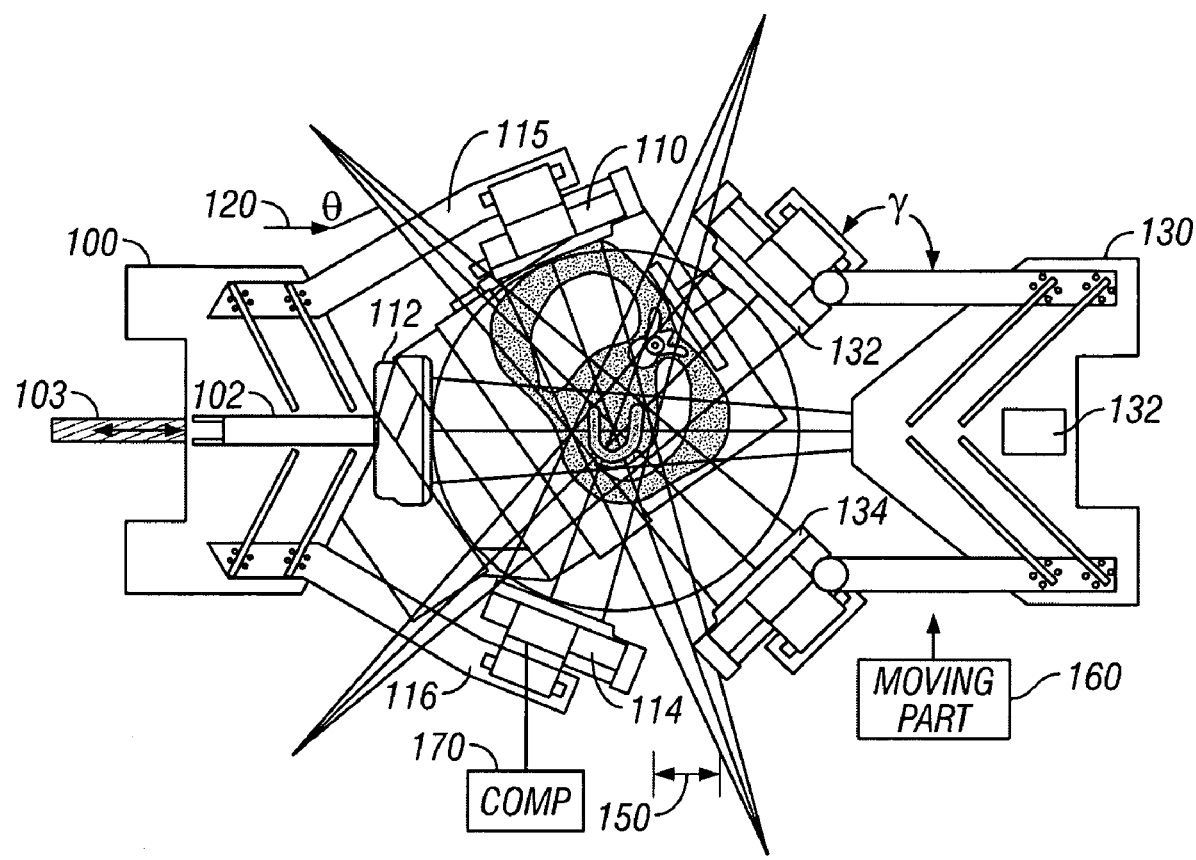
FIG. 1 shows an embodiment with five heads on multiple different head holding arms.

Imaging gamma ray detector heads have been developed that have small dead spaces surrounding the imaging field-of-view (FOV). In addition, small field-of-view (SFOV) detector heads that have an area just large enough to cover the area of the heart have been used to perform cardiac SPECT.

An embodiment uses these characteristics to arrange four or more than four of these SFOV heads within 360°. An embodiment uses five heads, and still allows patient ingress into the area defined inside the heads.

The following illustrates an embodiment using five heads. SFOV systems with other than four or five heads. One aspect defines that the heads have an angle between them that is other than 90 degrees.

The use of SFOV detector heads offers many advantages, including that the imaging orbit radius may be less than 25 cm.

FIG. 1 shows an embodiment. The FIG. 1 embodiment includes two separated head holding structures. The first head holding structure 100 is shown holding three heads 110, 112, 114. Each of the heads is attached to a bracket, for example, head 110 is attached to a bracket 115. The bracket extends at a specified angle θ relative to the axis shown as 120. The bracket 116 which holds head 114 may extend at the same angle θ but in an opposite direction. In the embodiment, the face of head 112 is substantially perpendicular to the axis 120.

The second head holding structure 130 is separated from, and separately movable relative to, the first head holding structure 110. It also holds the heads at specified angles, where the head 132 is held at an angle γ relative to the axis, and the head 134 may be held at the same angle γ, but facing in the opposite direction, to have the same angular absolute value. At least one of the head holding structures 100, 130 is movable. The holding structure 100 includes a slide 102 which slides on a support 103 and allows the head holding structure to be moved in the direction of the axis 120. And an alternative embodiment, however, the support structure 100 may be hinged, to enable it to move in a different plane, or to rotate.

The head holding structure 130 may also include a comparable slide structure shown as 132. One or both of the head holding structures 100, 132 may be moved along the axis, to open a space at 150. The patient may enter through the space 150. In operation, the heads can be separated, the patient can obtain ingress, and then images can be taken, the heads are again separated, and the patient may exit the imaging area.

In operation, one structure is moved relative to another structure. A moving part 160 is shown. The moving part may rotate the heads relative to the patient, or may rotate the patient relative to the heads. In the embodiment, it may be simpler to rotate the patient, since otherwise both separately-supported heads will need to be rotated. However, rotation of either is possible.

The medical information from the heads indicates information indicative of organs or areas of interest within a patient to be viewed. That information is sent to a computer 170 for processing to determine the medical information. The computer 170 may be a general purpose computer such as a Pentium-class computer running Windows XP. FIG. 1 shows the information from only one head being sent to the computer, but it should be understood that the information from all the heads is appropriately connected.

This embodiment can be used for any kind of medical imaging, but maybe preferably used for radiological based imaging such as single photon or single positron imaging. The embodiment shows imaging different body organs, but it should be understood that this can also be used for imaging the brain or some other organ, or even the entire body.

FIG. 1 shows the use of a fanbeam collimator. Parallel hole collimators or collimators of other configurations can also be used. The FIGURE also illustrates an upright, rotating chair gantry system whereby the subject rotates in front of the imaging heads. The imaging heads could also be affixed to a gantry that rotates the heads around the subject to be imaged. The subject may be either upright, prone or supine.

The following illustrates an embodiment using five heads. The invention is not limited to systems with four or five heads.

Another embodiment may use more than two head holding structures.

Although only a few embodiments have been disclosed in detail above, other embodiments are possible and are intended to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, more than 5 heads may be used, and more than 2 support structures. A 6-head system may use 3 support structures, for example, each with 2 heads, and each being either stationary, or separately movable.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A medical imaging system, comprising:
   a first head holding structure, including a first bracket holding a first medical imaging head facing an imaging area and at a first angle relative to said imaging area, and a second bracket holding a second medical imaging head facing said imaging area and at a second angle different than the first angle relative to said imaging area;
   a second head holding structure, including a third bracket holding a third medical imaging head facing said imaging area, and at a third angle relative to said imaging area, and a fourth bracket holding a fourth medical imaging head facing said imaging area, and at a fourth angle different than the third angle relative to said imaging area, and where said first, second, third and fourth imaging heads collectively surround said imaging area from four substantially opposite sides thereof; and
   a sliding structure, associated with said second head holding structure, and which allows said head holding structure to be slid along a linear axis which maintains substantially constant said first, second, third and fourth angles, which opens further a space between one of said heads on said first head holding structure and said heads on said second head holding structure, and where said space leads into said imaging area.

2. A medical imaging system as in claim 1, further comprising a moving part which enables rotating one of the medical imaging heads or the subject, relative to the other.

3. A medical imaging system as in claim 2, wherein said first and second angles define substantially tangents to an axis of said rotating.

4. A medical imaging system as in claim 1, wherein said medical imaging heads are detector heads for single photon imaging.

5. A medical imaging system as in claim 1, wherein said sliding structure has a first position which opens an opening to said imaging area, and has a second position closes said opening in a way that prevents a patient from entering said area of imaging.

6. A medical imaging system as in claim 2, wherein said first head holding structure also includes a sliding structure which allows sliding said head holding structure along said linear axis.

7. A medical imaging structure as in claim 2, wherein there are five heads, three of said heads being on said second head holding structure and two of said heads being on said first head holding structure, and said two heads on said first head holding structure each face with the same absolute value of angle towards said subject.

8. A method, comprising:
   forming a medical imaging system with at least four imaging heads, each facing radially towards an imaging area in which said subject is adapted to be located and collectively surrounding said imaging area, and with a first set of said imaging heads supported by a first support part and a second set of said imaging heads supported by a second support part, and
   enabling moving said second support part in a radial direction, and in a way that opens an opening between at least two of said imaging heads that allows a patient ingress to said imaging area, wherein said enabling moving moves between a first position which opens which allows said ingress to said imaging area, and a second position which closes said opening in a way that surrounds said area of imaging and prevents a patient from entering said imaging area.

9. A method as in claim 8, further comprising
   moving said second support part, to allow a patient ingress to said imaging area,
   using said medical imaging system to obtain images while said patient is in the said imaging area, and
   moving said second support part to allow the patient to exit from said imaging area.

10. A method as in claim 9, further comprising rotating one of said patient or said heads relative to the other of said patient or said heads during said using said medical imaging system to obtain images.

11. A method as in claim 8 wherein said enabling moving allows movementin a way that maintains substantially constant an angle formed between each said imaging head and said imaging area.

12. A method as in claim 9, further comprising enabling moving said first support part in said radial direction.

13. A method as in claim 9, wherein there are five of said imaging heads, three on said first support part and two on said second support part.

14. A method as in claim 9, wherein a facing direction of each of said imaging heads is substantially perpendicular to a tangent to a rotation direction of said imaging heads.

15. A method as in claim 9, further comprising also moving said first support part in said radial direction.

16. An apparatus, comprising:
   a first head holding structure, holding at least first, second and third medical small field of view imaging heads, each of said first, second and third imaging heads having a surface facing in a specified angle which forms a tangent to a first circular axis which encloses an area of patient imaging;

a second head holding structure, including at least fourth and fifth medical small field of view imaging heads, each facing to form a tangent to said first circular axis, and said first, second, third, fourth and fifth field of view imaging heads collectively surrounding said area of patient imaging;

a head holding structure movement part, which enables one of said first and second head holding structures to be moved in a direction which is radial to said first circular axis and which in a first position opens an opening to said area of patient imaging, and in a second position closes said opening in a way that prevents a patient from entering said area of patient imaging;

a rotating part, which rotates either the patient, or said first and second head holding structure, relative to the other, and in a direction of said first circular axis.

17. An apparatus as in claim 16, further comprising a computer that receives medical imaging information from said heads, and produces medical information therefrom.

18. An apparatus as in claim 16, wherein said head holding structure movement part also enables both of said first and second head holding structures to be moved radially relative to said area of patient imaging.

19. An apparatus as in claim 16, wherein said specified angles of each of said first, second, third, fourth and fifth imaging heads are substantially the same in both said first and second positions.

* * * * *